United States Patent [19]
Milliman

[11] Patent Number: 5,873,941
[45] Date of Patent: Feb. 23, 1999

[54] CORE TUBE FOR CROSS-HEAD DIE APPARATUS

[76] Inventor: James A. Milliman, 8644 Emerald Cir. South, Rome, N.Y. 13440

[21] Appl. No.: 855,786

[22] Filed: May 12, 1997

[51] Int. Cl.$^6$ .............................. B05C 3/12; B05C 3/02
[52] U.S. Cl. .................. 118/419; 118/405; 118/420; 239/596; 425/113; 425/114; 425/133.1; 425/192
[58] Field of Search .................. 118/405, 419, 118/420; 425/113, 114, 133.1, 192; 239/596

[56] References Cited

U.S. PATENT DOCUMENTS

| | | | |
|---|---|---|---|
| 5,031,568 | 7/1991 | Milliman | 425/113 |
| 5,183,669 | 2/1993 | Guillemette | 425/113 |
| 5,316,583 | 5/1994 | Milliman | 118/405 |
| 5,540,775 | 7/1996 | Milliman | 118/405 |
| 5,565,218 | 10/1996 | Brown et al. | 425/113 |
| 5,665,161 | 9/1997 | Milliman et al. | 118/405 |

*Primary Examiner*—Peter Chin
*Assistant Examiner*—Jacqueline Ruller
*Attorney, Agent, or Firm*—George R. McGuire

[57] ABSTRACT

A core tube for mounting in the axial bore of the body of cross-head die apparatus through which a filamentary member is drawn as a layer of flowable coating material is applied thereto. The coating material is injected through a radial bore having an axis intersecting an annular groove extending 360 degrees around the core tube. The annular groove communicates with a flow passage leading to the die orifice both through an annular space surrounding the forward end of the groove and through three axial grooves, two of which are of the same size and the other larger. The larger groove is positioned 180 degrees from the axis of the radial bore in the die body and 100 degrees from each of the small grooves.

7 Claims, 3 Drawing Sheets

CORE TUBE FOR CROSS-HEAD DIE APPARATUS

BACKGROUND OF THE INVENTION

The present invention relates to cross-head die apparatus for applying a continuous layer of coating material to a filamentary member as the latter is moved axially through the apparatus. More specifically, the invention relates to an improved core tube for distributing the coating material evenly about the filamentary member.

Applicant's prior U.S. Pat. Nos. 5,031,568, 5,316,583, 5,540,775 and 5,544,403, and application Ser. No. 08,881, 576 all disclose cross-head die apparatus including an element known as a core tube which assists in even distribution and axial flow through the apparatus of a flowable coating material which is injected radially into the die body. At least some embodiments of the core tubes of all the aforementioned patents and application include axial grooves through which at least some of the coating material flows from an annular groove in the core tube forwardly toward the die orifice.

In application no. (Model 99B), a pair of axial grooves are positioned at 180 degree intervals and are specified to be optional; when provided, the axial grooves are relatively small with the majority of the coating material flowing through the space between a lip adjoining the annular groove in the core tube and the surrounding portion of the axial bore in the body. No particular number of axial grooves is specified in the referenced patents, although the grooves are of equal dimensions and spaced at equal intervals about the periphery of the core tube. Also, the axial grooves in the referenced patents are described as large in cross section relative to the space between the lip and bore, whereby all or most of the coating material flows through the axial groove.

SUMMARY OF THE INVENTION

It has been found that uniformity of flow and distribution of the coating material, and thus uniformity of thickness of the coating on the filamentary member are optimized by providing three axial grooves, two of which are equal and the third larger in cross section. The rotational orientation of the core tube within the axial bore in the body is such that the larger groove is centered 180 degrees from the center of the radial bore through which the coating material injected under pressure into the radial bore. The two smaller grooves are each centered 100 degrees from the larger groove and thus 160 degrees from one another and 80 degrees from the radial bore. A clearance of preferably about 0.015" is provided between the periphery of the lip adjoining the forward side of the 360 degree annular groove in the core tube and the surrounding portion of the axial bore in the body. The base of the annular groove is cylindrical and an outwardly tapering wall extends, preferably at about 45 degrees, from the base of the groove forwardly to the peripheral lip.

The foregoing and other features of construction and operation of the invention will be more readily understood and fully appreciated from the following detailed description, taken in conjunction with the accompanying drawings.

DETAILED DESCRIPTION

Figure 1:
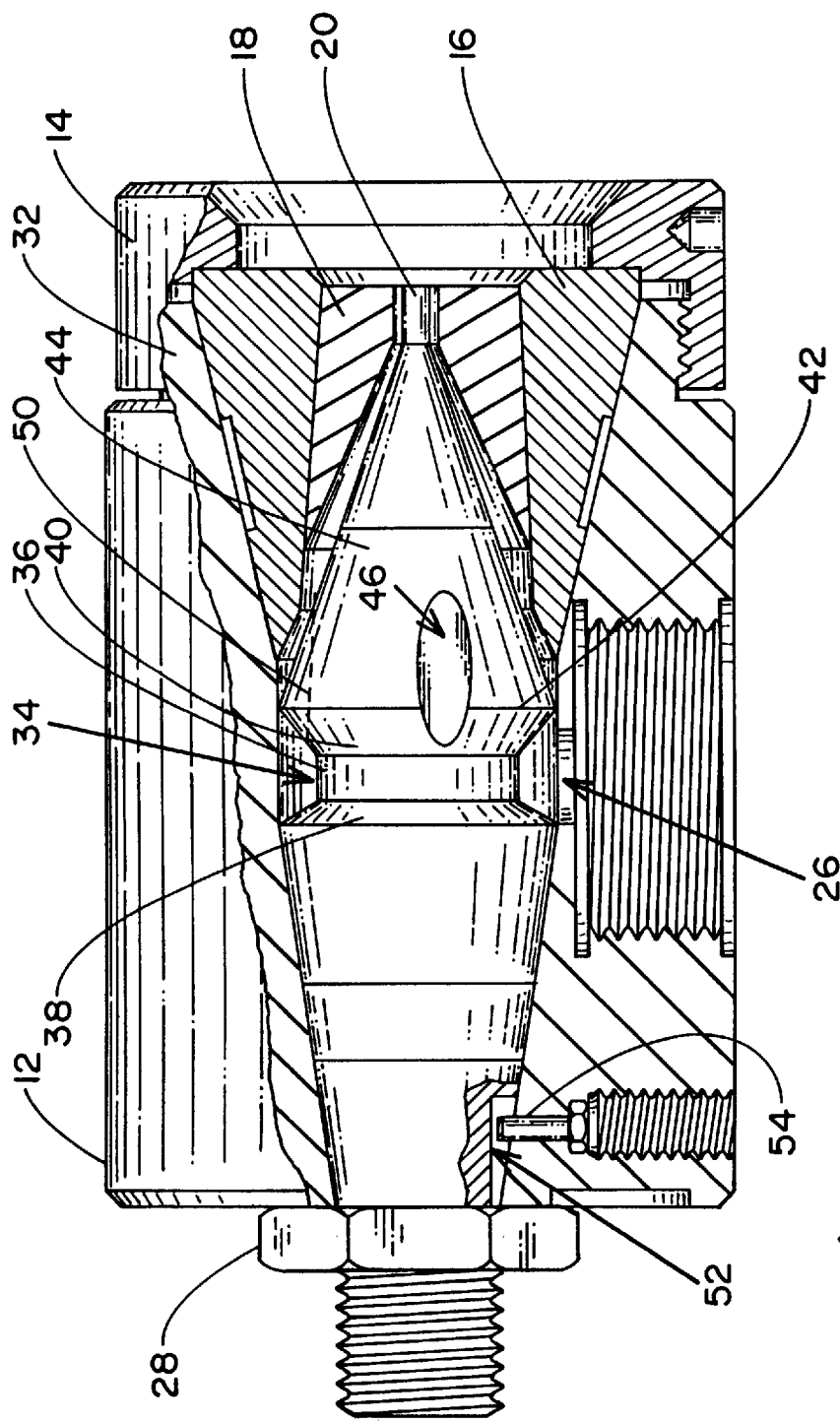
FIG. 1 is a side elevational view, partly in section, of cross-head die apparatus incorporating the present invention.
Figure 2:
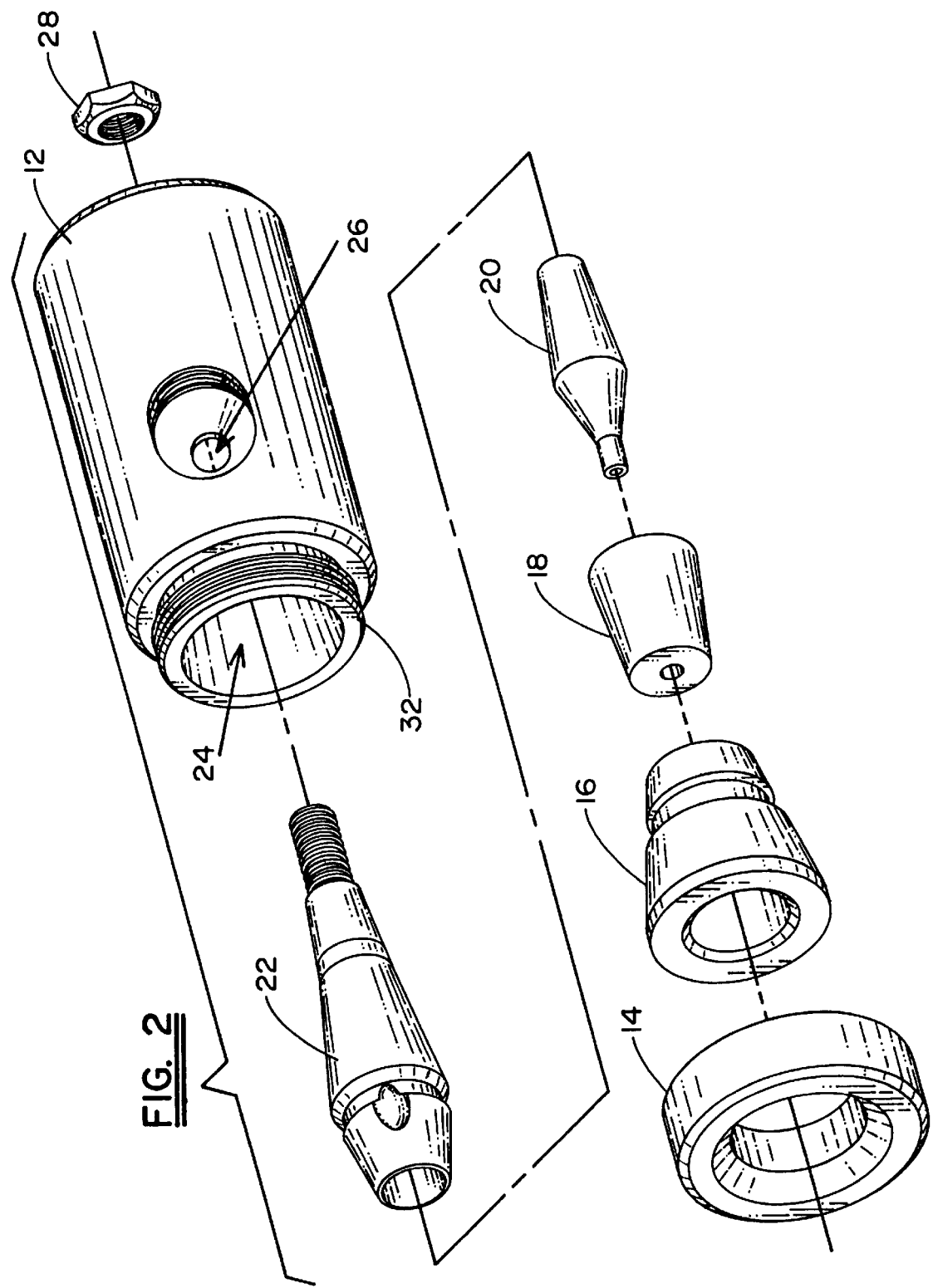
FIG. 2 is an exploded, perspective view of the apparatus of FIG. 1.

Referring now to the drawings, cross-head die apparatus 10 incorporating the present invention is shown in fully assembled condition in FIG. 1, and with the component parts axially separated in FIG. 2. Components of apparatus 10 include body 12, cover 14, die holder 16, die 18, tip 20, and core tube 22. Axial bore 24 extends through body 12 and radial bore 26 extends through the side of the body to communicate with the axial bore in the usual manner of cross-head die apparatus. The other elements are assembled with body 12 by inserting core tube 22 from front to rear into axial bore 24. Jam nut 28 is threaded upon a rear portion of core tube 22 which extends rearwardly of body 12 and tightened into engagement with the rear surface of the body. Tip 20 includes a rear portion inserted in an axial bore through core tube 22, and a front portion extending forwardly from the core tube. The filamentary member (wire, optical fiber, etc.) to be coated is moved through an axial bore in tip 20. The exterior surface of die 18 mates with the surface of a bore in die holder 16. The exterior surface of die holder 16 mates with the forward portion of axial bore 24, and cover 14 is installed on threaded collar 32 and the front end of body 12.

Figure 3:
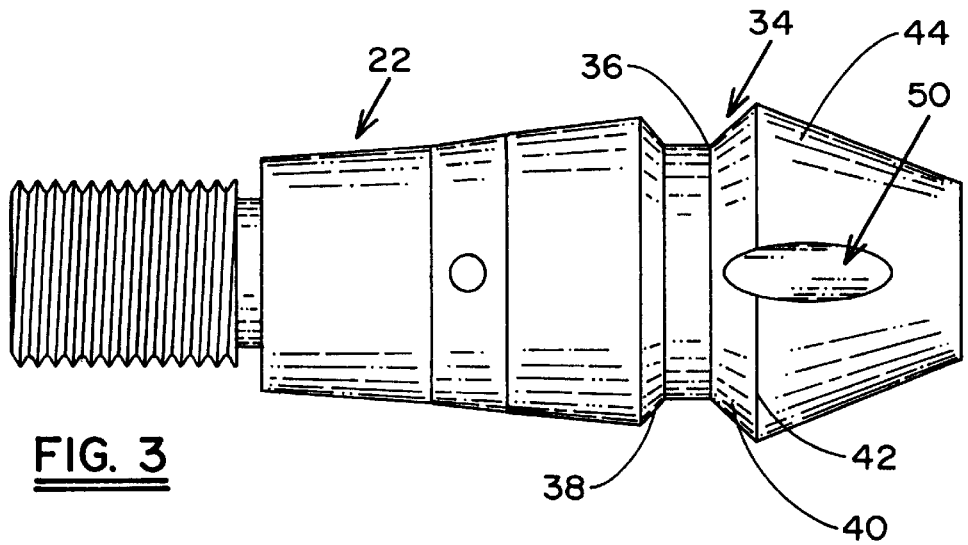
FIGS. 3 and 4 are side and front elevational views, respectively, of the core tube of the apparatus of FIGS. 1 and 2.
Figure 4:
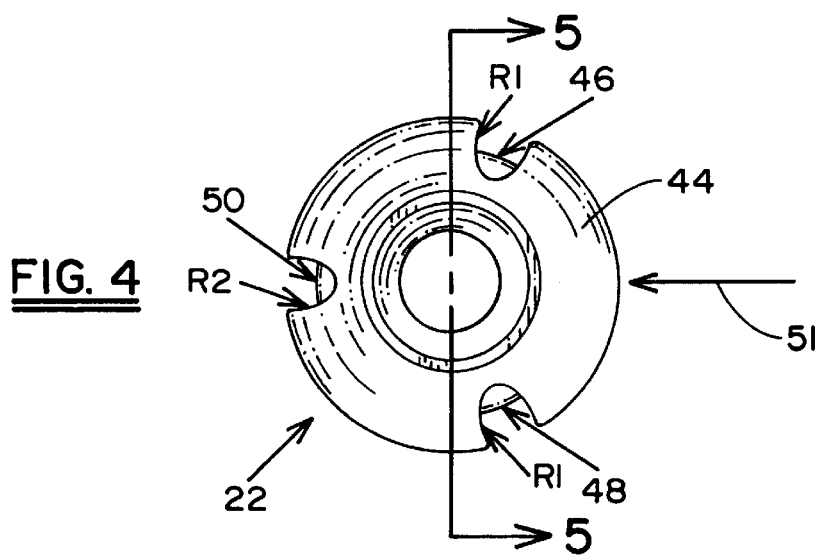
Figure 5:
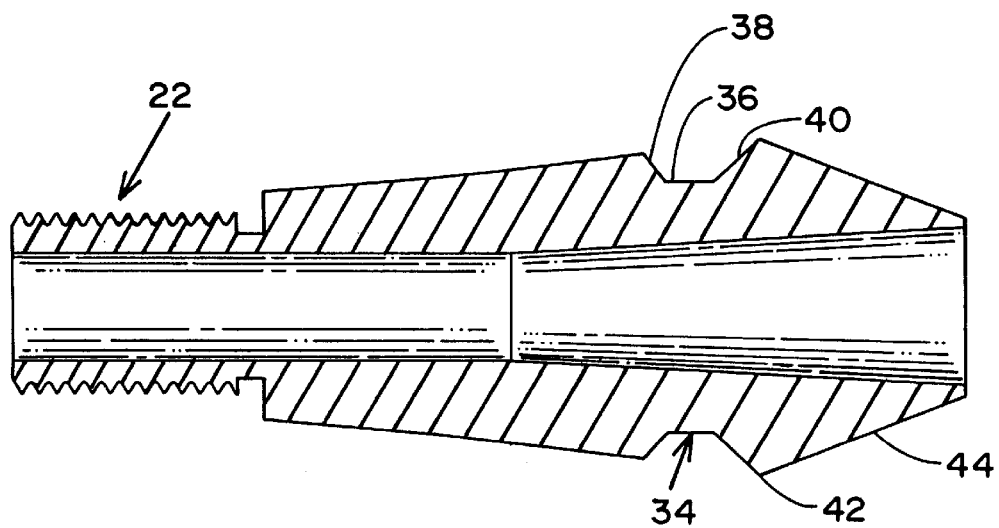
FIG. 5 is a side elevational view in section on the line 5—5 of FIG. 4.

Core tube 22, with which the present invention is principally concerned, is shown separately in FIGS. 3–5. Annular groove 34 extends 360 degrees around the core tube and includes cylindrical base 36 from which rear and front walls 38 and 40, respectively, taper outwardly toward the rear and front ends of core tube 22. Rear and front walls 38 and 40 taper outwardly at angles of, for example, 22 degrees and 45 degrees, respectively, with respect to planes perpendicular to the longitudinal centerline of core tube 22. Rear wall 38 extends from base 36 to the surface of core tube 22 which mates with bore 24 shown in FIG. 2, while front wall 40 extends from base 36 to lip 42 which separates groove 34 from external surface 44, tapering inwardly from lip 42 to the front end of core tube 22.

As best seen in FIG. 4, three axial grooves 46, 48 and 50 of substantially semi-circular transverse cross-section are formed between annular groove 34 and forward surface 44. In the plane of their maximum transverse cross-section, i.e., the plane of lip 42, grooves 46 and 48 have equal radii R1, while groove 50 has a radius R2, larger than R1. The mid-points of grooves 46 and 48 are spaced about the periphery of core tube 22 160 degrees from one another, and the mid-point of groove 50 is spaced equally, 100 degrees, from the mid-points of each of grooves 46 and 48. Keyway 52 is formed in core tube 22 and pin 54 (FIG. 1) extends from body 12 into the keyway to establish the desired rotational orientation of the core tube in axial bore 24 of the body. This is the orientation shown in FIG. 4, assuming the mid-point of radial bore 26 in body 12 to be positioned on the horizontal centerline, represented by line 51, to the right of core tube 22, i.e., the mid-point of the radial bore is 80 degrees from the mid-points of each of grooves 46 and 48 and 180 degrees from the mid-point of groove 50.

Referring again to FIG. 1, it will be seen that the external surface of core tube 22 extending rearwardly from the rear side of groove 34 is configured to engage the opposing portion of bore 24. Radial bore 26, through which the flowable coating material enters apparatus 10, is laterally adjacent groove 34. Lip 42 is spaced inwardly a short distance, e.g., 0.015", from the surrounding wall of bore 24. Thus, a portion of the coating material may flow over lip 42 around its entire periphery, although the majority will flow through axial grooves 46, 48 and 50 which have a combined area at least twice that of the annular space surrounding lip 42. The coating material flows from groove 34 through the flow passage defined by the external surfaces of the forward portions of core tube 22 (i.e., surface 44) and tip 20, and the surrounding, spaced, surface portions of bore 24, die holder 16 and die 18. As the filamentary member (not shown) emerges from the forward end of tip 20 it is uniformly covered by coating material emerging from the orifice of die 18 surrounding tip 20. In the preferred embodiment, R1 is between 50% and 80% of R2, most preferably about 65%. For example, a core tube having a diameter at lip 40 of 1.168", R1 and R2 may be 0.120" and 0.187", respectively.

What is claimed is:

1. A core tube for use in cross-head die apparatus having a body with an axial bore through which a filamentary member is longitudinally moved for application thereto of a coating material, said body having a radial bore through which said coating material is injected into said axial bore, said core tube comprising:

a) a hollow member having a longitudinal axis, front and rear ends, and an external surface with a first portion configured for mating engagement with opposing portions of said axial bore;

b) an annular groove extending 360 degrees around said external surface at a position forwardly of said first portion and rearwardly of said front end and separated from said front end by a second portion of said external surface which tapers conically inwardly to said front end; and c) first, second and third axial grooves, each having a substantially semi-circular cross-section, through which said annular groove communicates with the space surrounding said second surface portion, said second and third axial grooves having maximum transverse cross-sectional areas which are substantially equal to one another and less that the maximum transverse cross-sectional area of said first axial groove, said second and third axial grooves having mid-points which are equally spaced about the circumference of said external surface from the mid-point of said first groove and are spaced further from one another than from the mid-point of said first axial groove.

2. The core tube of claim 1 wherein the centers of said second and third axial grooves are each spaced about 100 degrees from the center of said first axial groove and about 160 degrees from one another.

3. The core tube of claim 1 wherein said second and third axial grooves have radii between about 50% and about 80% of the radius of said first axial groove in said respective planes.

4. The core tube of claim 3 wherein said second and third axial grooves have radii about 65% of the radius of said first axial groove.

5. The core tube of claim 1 wherein said annular groove has a cylindrical base surface.

6. The core tube of claim 5 wherein said annular groove has a forward surface tapering conically outwardly from said base surface to a junction with said second portion of said external surface.

7. The core tube of claim 6 wherein said forward surface tapers outwardly at an angle of about 45 degrees.

* * * * *